Dec. 13, 1932.  L. D. TITUS  1,891,195
CAN FEEDING MACHINE
Filed June 6, 1930  3 Sheets-Sheet 1
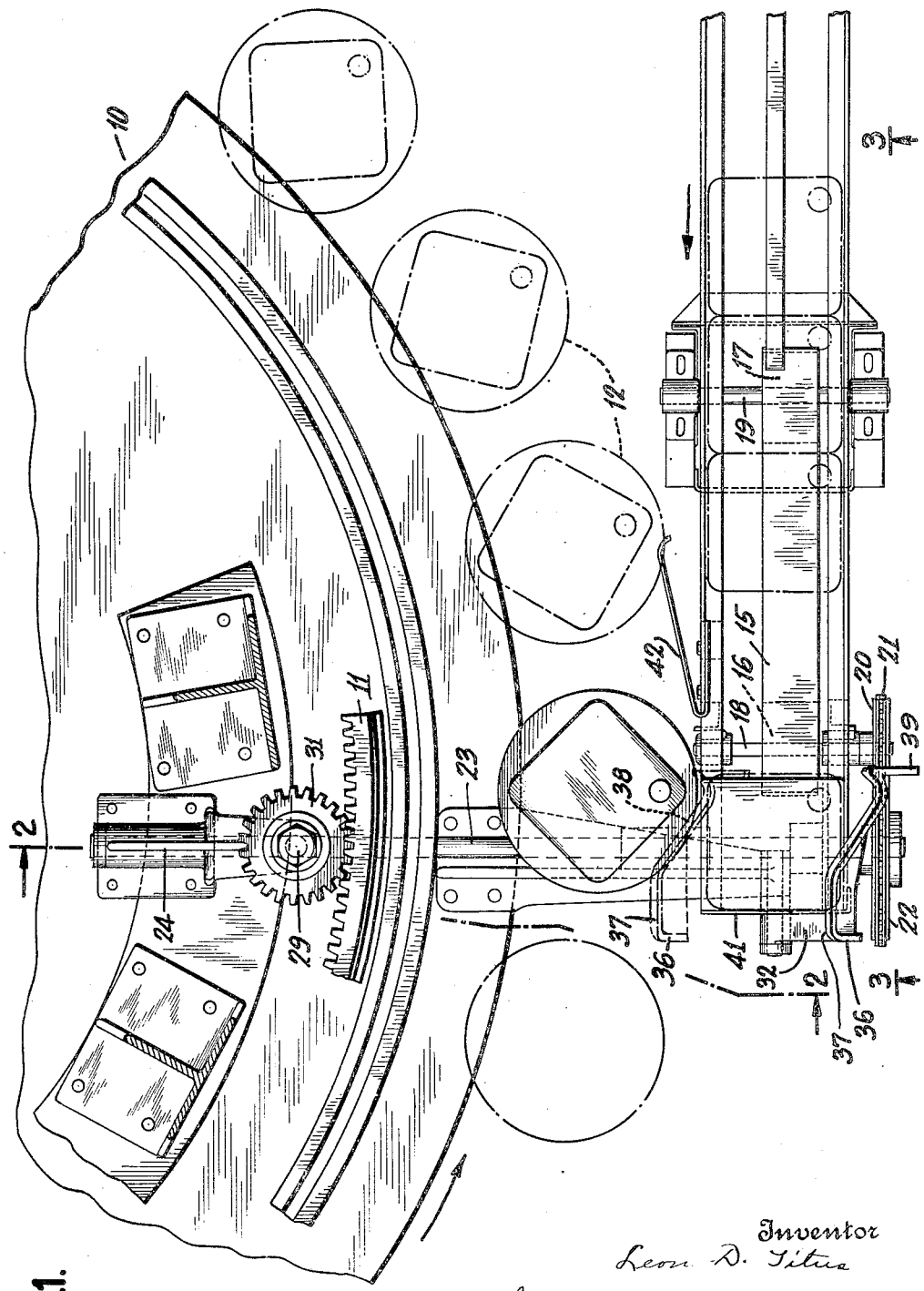
Inventor
Leon D. Titus
By his Attorney
R. J. Dearborn

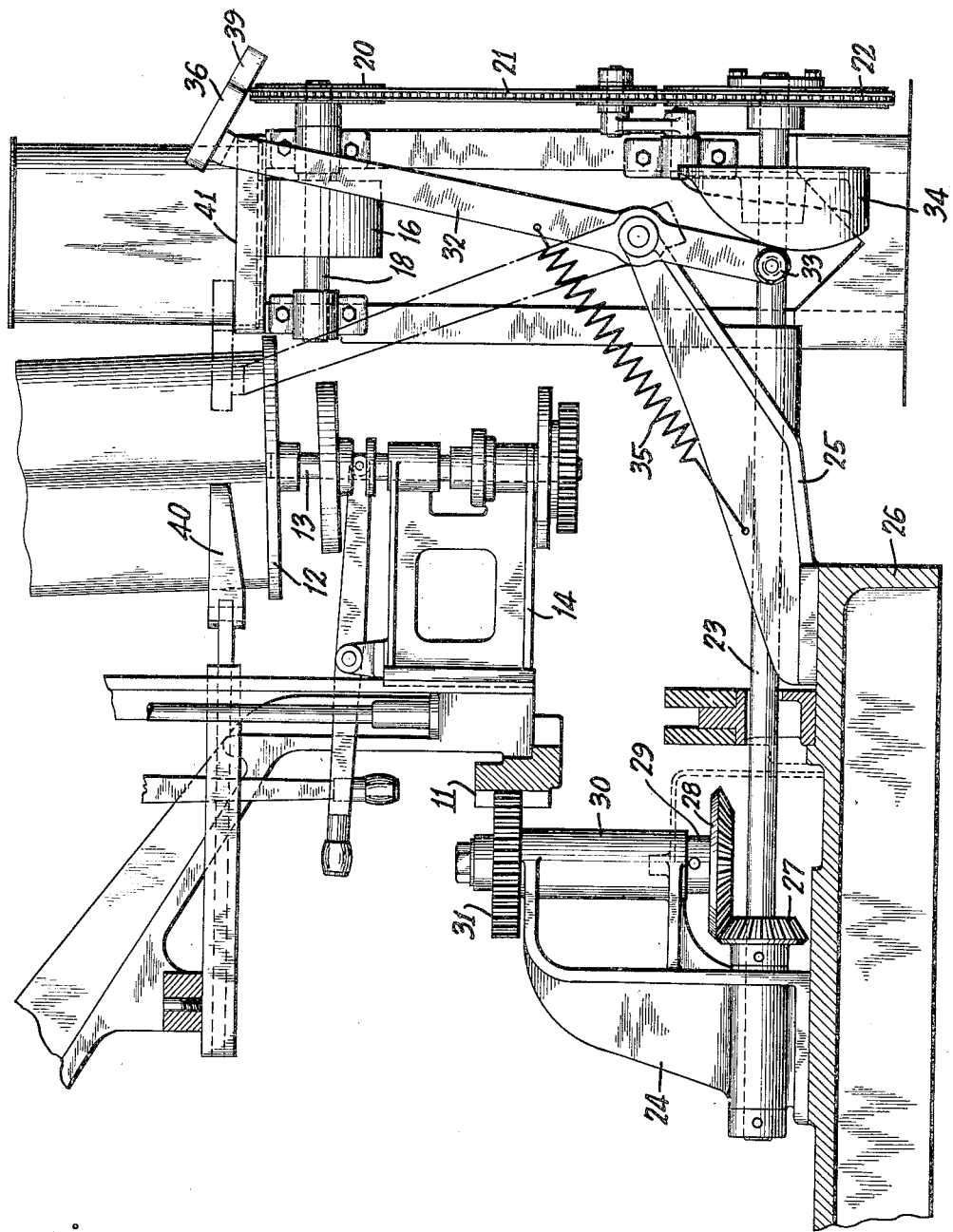

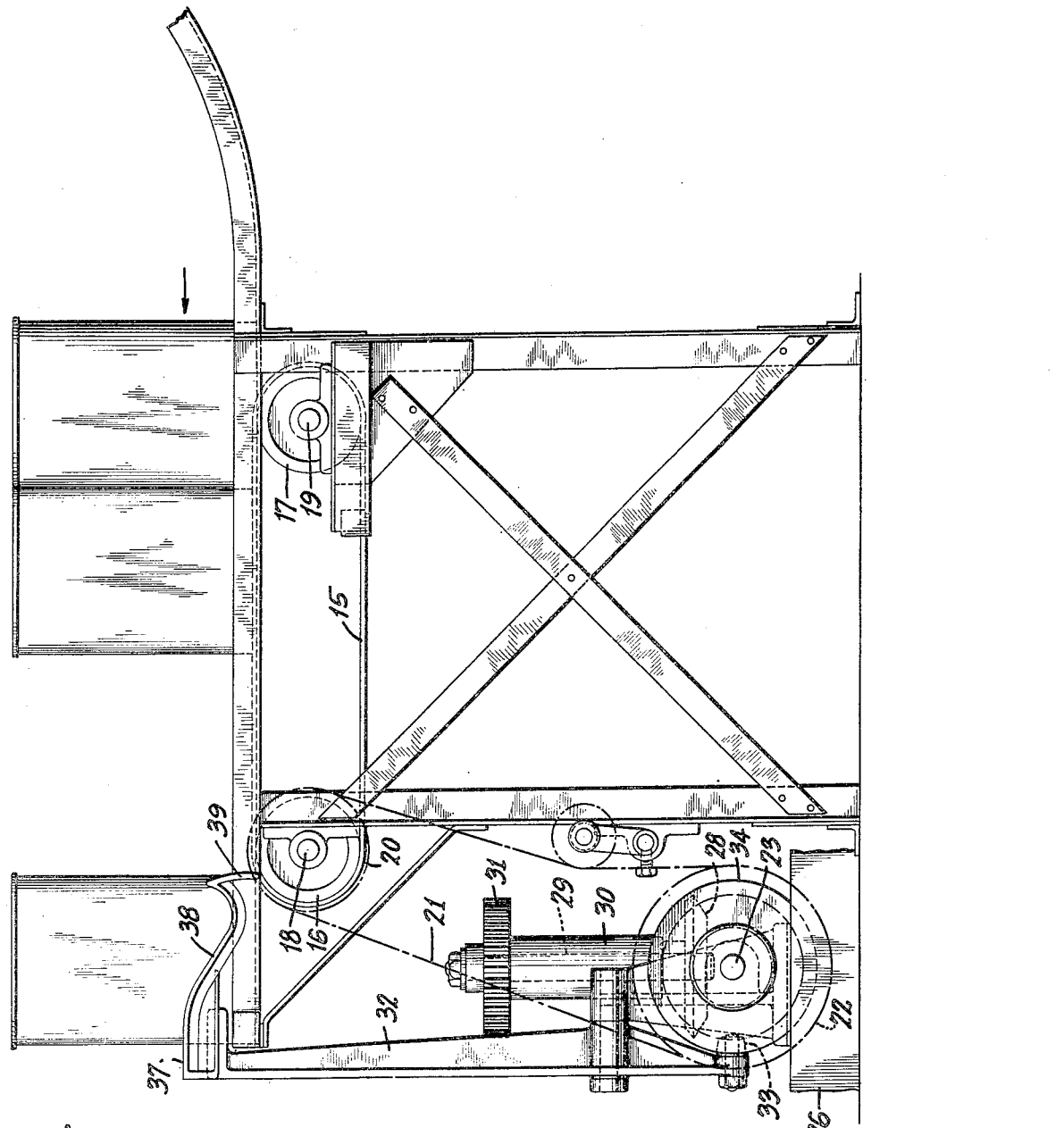

Patented Dec. 13, 1932

1,891,195

UNITED STATES PATENT OFFICE

LEON D. TITUS, OF PORT ARTHUR, TEXAS, ASSIGNOR TO THE TEXAS COMPANY, OF NEW YORK, N. Y., A CORPORATION OF DELAWARE

CAN FEEDING MACHINE

Application filed June 6, 1930. Serial No. 459,488.

This invention relates to apparatus for transferring cans or other articles from a moving conveyor to a machine.

The modern can factory is designed to speed up production and is equipped to minimize the manual handling of cans. These results are brought about largely by the use of specially designed machines, each capable of performing some special operation, and the cans pass in continuous and timely succession from one stage to the next in the cycle of operation. Continuously moving belt conveyors may be used for the transportation of the incomplete cans from one manufacturing stage to another, but as such conveyors are not in themselves capable of feeding the cans to the several machines it is necessary to provide an apparatus which is capable of taking cans from the belt conveyors and delivering them separately and at spaced intervals in the cycle of operation to the machine in which they are to be subjected to the next of the manufacturing steps.

The present invention is particularly adapted for use with machines which operate in a continuous manner, and it is an object of my invention to provide an apparatus for transferring a can or other object from a conveyor to a machine in which the can or other object is to undergo some step in the manufacturing process.

Another object of my invention is to provide an apparatus for controlling the delivery of cans or other objects from a conveyor to a machine in order that successive deliveries may be made at the proper moments in the cycle of operation of the machine.

A further object of the invention is to provide an apparatus for regulating the delivery of cans or other objects from a conveyor to a machine so that deliveries will be effected in synchronism with the movement of the machine.

These and other objects, features and advantages of my invention will appear as the description thereof proceeds, reference being had to the accompanying drawings in which, Figure 1 is a top plan view of a portion of a machine for filling and capping cans in conjunction with an apparatus embodying my invention for feeding cans to the machine.

Figure 2 is a view in end elevation, partially in section, taken on the broken line 2—2 of Figure 1, and Figure 3 is a partially sectional side elevation taken on line 3—3 of Figure 1.

As illustrative of one manner of employing the present invention it is shown in conjunction with a can filling and capping machine as covered in the Rollin L. Drake Patent No. 1,823,889, patented September 22, 1931, inasmuch as the device of the present invention may be advantageously employed in connection with machines of the type disclosed in said patent. The filling and capping machine referred to comprises a rotary conveyor provided with a series of tables each of which is capable of supporting a can during the filling and capping operation. Cans are fed to the machine at regular intervals in order that they may be properly positioned upon the supporting tables where they are held during the filling and capping operation and from which they are subsequently discharged when the filling and capping operation has been completed. With a machine of this type it is essential that the empty cans be supplied continuously and that they be fed to the machine at the proper moments in the cycle of operation in order that they may assume their correct position.

Referring to the drawings, the can feeding apparatus is shown in position to deliver cans to a filling and capping apparatus of the type referred to above and which includes a rotary conveyor 10 provided with an internal ring gear 11 to which power is applied through suitable means to rotate the conveyor. The conveyor is also provided with supporting mechanism for the containers to be filled and capped. This mechanism includes a plurality of tables or supports 12 mounted on rotatable shafts 13 which are journalled in bearings in a bracket member 14 mounted on the conveyor.

Cans traveling down a chute or on a conveyor in the direction indicated by the arrow in Figure 1 are delivered to a belt conveyor 15 which is carried on pulleys 16 and 17 mounted on rotatable shafts 18 and 19, respectively. Shafts 18 and 19 are journalled in bearings provided in the supporting frame work of the machine and at one end of the frame a stop 41 is provided for limiting the forward movement of the cans on the conveyor.

Shaft 18 extends beyond the side of the supporting frame and on its extended end has a sprocket 20 carrying a link chain 21. Chain 21 also engages a sprocket 22 mounted on one end of a horizontally disposed rotatable shaft 23 which is journalled in bearings formed in brackets 24 and 25 secured to the base 26 upon which the rotary conveyor 10 is mounted.

A bevel gear 27 is mounted on the opposite end of shaft 23 and meshes with another bevel gear 28 secured on the lower end of a vertically disposed rotatable shaft 29 mounted in a bushing 30 on bracket 24. A gear wheel 31 is mounted on the upper end of shaft 29 and meshes with the internal ring gear 11 of the filling and capping machine so that the rotation of the conveyor 10 imparts a like motion to gear 31 and, through the interconnecting mechanism just described, to the belt conveyor 15.

A rocker arm 32 is pivotally connected intermediate its ends to one end of bracket 25. The lower end of arm 32 is provided with a cam follower 33 which is adapted to be engaged and actuated by a cam 34 mounted on shaft 23. A spring 35 is fastened at one end to bracket 25 and at its other end to the upper portion of arm 32 and tends to pull the upper portion of the arm to the left, as viewed in Figure 2.

The surface of cam 34 is so shaped that contact with the follower 33, in connection with the force exerted by spring 35, produces a rocking motion of arm 32, and in Figure 2 the arm is shown in the different positions reached at the beginning and end of its travel. The upper end of the arm, as shown in solid lines in Figure 2, has reached the limit of its movement to the right as a result of the force exerted against the lower portion of the arm by the raised portion of the cam surface against the tension of spring 35. As cam 34 rotates with shaft 23 the tension exerted by the spring causes the follower 33 to follow the declining surface of the cam until the upper portion of the rocker arm has assumed the position as shown in broken lines in Figure 2.

The upper end of rocker arm 32 is provided with a can positioning and actuating member in the form of an angular rod 36 shaped to provide a section 37 parallel to the sides of the cans and adapted to bear against a forward corner of an advancing can until the can has turned about 45°. Rod 36 is also formed with an inclined section 38 which is adapted to engage the turned can and hold it in this position while it is moved on to one of the tables 12. Rod 36 is likewise provided with a straight tail piece 39 extending in a direction away from the filling and capping machine and parallel with the forward faces or sides of the cans advancing on the conveyor 15. This tail piece serves as a stop to hold back the succeeding cans on the conveyor 15 until the actuating member returns to the position shown in solid lines in Figure 1 and is ready to engage the next can in the line.

The filling and capping machine may be provided with can positioning members in the form of angular gauges 40 in order to insure proper positioning of the cans upon the supporting tables 12. A resilient member which may take the form of a flat spring 42 is secured to the supporting frame of the can feeding apparatus and forces back into position on the supporting tables 12 any cans which may tend to rebound from the tables as a result of the speed with which they are delivered thereto and against the gauges 40.

The operation of the combined apparatus is as follows: Power from a suitable source is used to continuously rotate the conveyor 10 and the rotation thereof actuates gear wheel 31 by reason of the fact that this wheel meshes with the internal gear 11 of the conveyor. Shaft 29, to the upper end of which wheel 31 is connected, is caused to rotate and imparts a like movement to wheels 28 and 27 and to the shaft 23 to which wheel 27 is secured.

Sprocket wheel 22, which is mounted on the end of shaft 23, rotates therewith to operate link chain 21. As this chain moves it causes sprocket wheel 20 with which it engages to rotate, and the rotation of this wheel causes a similar rotation of shaft 18 and pulley 16. Belt conveyor 15 which travels on pulleys 16 and 17 is thereby operated, and the operation thereof is continued as long as the internal gear 11 of the filling and capping machine is in motion. Cans which are either placed upon or fed to the conveyor 15 advance thereon until the first can in the line comes into contact with stop 14.

At this point in the cycle of operation the action of cam 34 has forced arm 32 to the extreme right and into the position shown in solid lines in Figure 2 so that section 37 of member 36 is in a position to engage a forward corner of the can when the arm moves to the left. The tension of spring 35 causes cam follower 33 to follow the declining surface of cam 34 whereby arm 32 is moved to the left as viewed in Figure 2. This movement of arm 32 brings section 37 into contact with the corner of the can and the continued movement of the arm to the left causes the can to turn through an angle of about 45° until it rests against the inclined portion 38. In this position the can is moved from the conveyor to the particular table 12 then in a position to receive it and the can comes to rest on the table and is maintained in this position by the gauge 40.

By the time one can has been moved into position on one of the tables 12 the rising surface of cam 34 again operates to force arm 32 to the left and this operation continues with the arm 32 rocking back and forth and successively moving cans from the conveyor 15 to the filling and capping machine, the operation of the arm being in synchronism with the operation of the filling and capping machine.

In the event that any can which has been moved to one of the tables tends to rebound from its seat it immediately contacts with spring member 42 and is forced thereby back into its proper position.

Thus, it will be seen that cans are continuously and at regular intervals transferred from the conveyor 15 to the filling and capping machine and as the conveyor is operated from the internal gear of the filling and capping machine it is apparent that the speeding up or slowing down of the can filling and capping machine will cause a corresponding change in the speed of the can feeding mechanism so that regardless of the speed of the former the speed of the latter is proportional to it.

Apparatus of preferred form and construction has been illustrated and described for the purpose of showing one way in which this invention may be practiced but the inventive idea is broader than this illustrative embodiment thereof and no limitations are therefore intended other than those imposed by the appended claims.

I claim:

1. Can feeding apparatus, comprising a conveyor for moving a can to a predetermined point, a can positioning and actuating member, formed with a portion thereof parallel to the side faces of the can for engaging a corner of the can to turn it on its axis, and another portion thereof at an angle to the first portion for maintaining the can in the turned position while ejecting it from the conveyor, and means for actuating said can positioning and ejecting member.

2. In apparatus for feeding cans to a machine in a predetermined position, the combination with a conveyor, of a can positioning and actuating member adapted to engage successive cans on said conveyor and move them to the machine, said member comprising an angular rod formed with a section parallel to the sides of the cans on the conveyor and adapted to bear against a section of a can on the conveyor and turn the can on its vertical axis, and means for moving the can positioning and actuating member to move the can from the conveyor to the machine.

3. In apparatus for feeding cans to a machine in a predetermined position, the combination with a conveyor, of a can positioning and actuating member adapted to engage successive cans on said conveyor and move them to the machine, said member comprising an angular rod formed with a section parallel to the sides of the cans on the conveyor and adapted to bear against a section of a can on the conveyor and turn the can on its vertical axis, and an inclined section adapted to engage the turned can and hold it in position while it is moved from the conveyor to the machine, and means for operating the can positioning and actuating member.

4. In apparatus for feeding cans to a machine in a predetermined position, the combination with a conveyor, of a can positioning and actuating member adapted to engage successive cans on said conveyor and move them to the machine, said member comprising an angular rod formed with a section parallel to the sides of the cans on the conveyor and adapted to bear against a forward corner of a can on the conveyor and turn the can on its vertical axis, an inclined section adapted to engage the turned can and hold it in position while it is moved from the conveyor to the machine, and a tail piece extending in a direction away from the machine and parallel with the forward faces of the cans on the conveyor for holding back the succeeding cans on the conveyor, and means for operating the can positioning and actuating member.

In witness whereof I have hereunto set my hand this 26 day of May 1930.

LEON D. TITUS.